US007609303B1

(12) United States Patent
Lee et al.

(10) Patent No.: US 7,609,303 B1

(45) Date of Patent: Oct. 27, 2009

(54) LOW NOISE ACTIVE PIXEL IMAGE SENSOR USING A MODIFIED RESET VALUE

(75) Inventors: Hae-Seung Lee, Bedford, MA (US); Keith G. Fife, Stanford, CA (US)

(73) Assignee: Melexis Tessenderlo NV, Tessenderlo (BE)

( * ) Notice: Subject to any disclaimer, the term of this patent is extended or adjusted under 35 U.S.C. 154(b) by 539 days.

(21) Appl. No.: 11/250,114

(22) Filed: Oct. 12, 2005

Related U.S. Application Data

(60) Provisional application No. 60/617,900, filed on Oct. 12, 2004.

(51) Int. Cl.
*H04N 5/217* (2006.01)
*H04N 3/14* (2006.01)

(52) U.S. Cl. ........................................ 348/241; 348/308

(58) Field of Classification Search ................. 348/241, 348/296, 294, 302, 308
See application file for complete search history.

(56) References Cited

U.S. PATENT DOCUMENTS

| | | | | |
|---|---|---|---|---|
| 5,946,033 | A * | 8/1999 | Mooney et al. | 348/312 |
| 5,949,483 | A * | 9/1999 | Fossum et al. | 250/208.1 |
| 6,115,066 | A * | 9/2000 | Gowda et al. | 348/308 |
| 6,320,616 | B1 | 11/2001 | Sauer | |
| 6,493,030 | B1 | 12/2002 | Kozlowski et al. | |
| 6,697,111 | B1 | 2/2004 | Kozlowski et al. | |
| 6,777,660 | B1 | 8/2004 | Lee | |
| 6,801,255 | B2 * | 10/2004 | Inui | 348/241 |
| 6,903,670 | B1 | 6/2005 | Lee et al. | |
| 6,911,640 | B1 * | 6/2005 | Bencuya et al. | 348/308 |
| 6,917,027 | B2 * | 7/2005 | Krymski | 250/208.1 |
| 7,045,753 | B1 * | 5/2006 | Fox | 348/308 |
| 7,154,075 | B2 * | 12/2006 | Krymski | 348/241 |
| 7,446,805 | B2 * | 11/2008 | Lee et al. | 348/241 |
| 7,456,879 | B2 * | 11/2008 | Lim et al. | 348/243 |
| 2002/0033439 | A1 * | 3/2002 | Bock | 250/208.1 |
| 2002/0158982 | A1 * | 10/2002 | Kokubun et al. | 348/308 |
| 2004/0174449 | A1 | 9/2004 | Lee et al. | |
| 2004/0174450 | A1 | 9/2004 | Lee et al. | |
| 2005/0083422 | A1 | 4/2005 | Lee et al. | |
| 2005/0206752 | A1 * | 9/2005 | Lim | 348/241 |
| 2006/0077273 | A1 * | 4/2006 | Lee et al. | 348/308 |
| 2008/0062286 | A1 * | 3/2008 | Beck | 348/241 |

FOREIGN PATENT DOCUMENTS

WO WO 2004/064025 A2 7/2004

OTHER PUBLICATIONS

"Ultra-Pocket® 5 Kit. Rapid Development Kit for 3.0-Megapixel Credit Card Cameras with Color TFT LCD Display", SMal Camera, Aug. 25, 2005, pp. 1-3, Technologies, http:www.smalcamera.com/up51cd.html.

"International Search Report", International Searching Authority, PCT/US2004/000153, Jul. 29, 2004, 3 pages.

"Written Opinion of the International Searching Authority", International Searching Authority, PCT/US2004/000153, Jul. 29, 2004, 8 pages.

Decker et al., "A 256×256 CMOS Imaging Array with Wide Dynamic Range Pixels and Column-Parallel Digital Output", IEEE Journal of Solid-State Circuits, Dec. 1998, vol. 33, No. 12, pp. 2081-2091.

Kozlowski et al., "A Progressive 1920×1080 Imaging System-on-Chip for HDTV Cameras", IEEE International Solid-State Circuits Conference, Feb. 8, 2005, Session 19, Digest of Technical Papers, pp. 358-359.

* cited by examiner

*Primary Examiner*—John M Villecco
(74) *Attorney, Agent, or Firm*—Gauthier & Connors LLP

(57) ABSTRACT

A method and apparatus to perform low noise reset of a pixel circuit within an active pixel image sensor.

34 Claims, 10 Drawing Sheets

LOW NOISE ACTIVE PIXEL IMAGE SENSOR USING A MODIFIED RESET VALUE

RELATED APPLICATIONS

This application claims the benefit of U.S. Provisional Application No. 60/617,900, filed Oct. 12, 2004, and incorporates that application by reference in its entirety.

TECHNICAL FIELD

The present invention relates generally to an image sensor and, more particularly, to low noise reset of a pixel circuit within an active pixel image sensor.

BACKGROUND

Solid-state image sensors have found widespread use in camera systems. The solid-state image sensors in some camera systems have a matrix of photosensitive elements in series with switching and amplifying elements. The photosensitive elements may be, for example, photoreceptors, photodiodes, PIN diodes, phototransistors, charge-coupled device (CCD) gate, or other similar elements. Each photosensitive element receives incident light corresponding to a portion of a scene being imaged. A photosensitive element, along with its accompanying electronics, is called a picture element ("pixel") or a pixel circuit. Each photosensitive element produces an electrical signal relative to the light intensity of the image. The electrical signal generated by the photosensitive element is typically a current proportional to the amount of electromagnetic radiation (light) incident on the photosensitive element.

Many image sensors are implemented using metal oxide semiconductor (MOS) or complimentary metal oxide semiconductor (CMOS) technology. Image sensors with passive pixels and image sensors with active pixels are distinguished within the MOS and CMOS imaging technologies. An active pixel amplifies/buffers the charge that is collected on its photosensitive element. A passive pixel does not perform signal amplification and employs a charge sensitive amplifier that is not integrated in the pixel.

FIG. 1 illustrates a conventional pixel reset system for an active pixel. The illustrated pixel reset system includes a conventional pixel circuit and a conventional uncorrelated double sampling (UDS) circuit. Within the pixel circuit, a photodiode, $D_P$, produces a photo current, $I_P$, proportional to the incident light intensity. The photo current is integrated on a sense capacitor, $C_S$. The sense capacitor is typically a parasitic reverse-biased PN junction capacitance associated with the photodiode and other parasitic capacitance. A sense MOS transistor, $M_2$, operates as a source follower that buffers the voltage on the sense node, Node 1, nondestructively to a readout column line. A row select MOS transistor, $M_3$, acting as a switch, activates the source follower transistor when the particular row including the pixel is selected. When the pixel is reset, the gate of a reset MOS transistor, $M_1$, is brought up to a driving voltage, $V_{DD}$, for example, and the voltage on the sense capacitor is reset to approximately $V_{DD}-V_{TH}$, where $V_{TH}$ is the threshold voltage of the reset transistor.

The reset level contains an error from pixel to pixel. The error has two components: a fixed error component and a random reset noise. The fixed error results from mismatches between the threshold voltage and transistor sizes. The fixed error is also referred to as fixed pattern noise (FPN). FPN negatively affects the uniformity of the pixel responses in the pixel array. Correction of this non-uniformity may implement some type of calibration, for example, by multiplying or adding/subtracting the pixel's signal with a correction amount that is pixel dependent. Conventional technologies to cancel FPN may be referred to as correlated double sampling, uncorrelated double sampling, or offset compensation, and are discussed in more detail below.

The random reset noise (also referred to as reset noise) is generated during the reset process for the pixel. The shot noise in the reset transistor during reset is band-limited by the transconductance of the reset transistor and the sense capacitor. This produces a root-mean-square (RMS) noise at the sense node. This RMS noise is described by the following equation:

$$\sqrt{\frac{kT}{2C_S}},$$

where $C_S$ is the capacitance of the sense capacitor, T is the absolute temperature (Kelvin) of the reset transistor, and k is Boltzmann's constant. This RMS noise may be sampled on the sense capacitor when the reset process is complete. As an example, the sampled RMS noise is 643 μV for a typical sense capacitor value of 5 fF at room temperature.

In principle, both the fixed and random error components can be removed by correlated double sampling (CDS). CDS technology uses two voltage measurements to remove the noise components. A first voltage (the reset value) is the pixel voltage immediately following a reset period. This measurement includes both the fixed and random components of the reset level error. The reset value may be stored in either analog or digital form. The second voltage (the integration value) is the pixel voltage after the integration period. The integration value contains the same error components introduced upon reset because the pixel has not been reset again. Additionally, the integration value includes the change in voltage on the sense capacitor due to the integrated photo current. A CDS circuit (not shown) outside the pixel circuit subtracts the reset value from the integration value, leaving only the light response term—the photo response voltage, $V_P$. Thus, a CDS circuit removes both the FPN and the random reset noise. The photo response voltage, which is the difference between the integration value and the reset value, is described by the following equation:

$$V_p = \frac{I_P T_{INT}}{C_S},$$

where $I_P$ is the integrated current on the sense capacitor, $T_{INT}$ is the integration period during which the photo current is integrated on the sense capacitor, and $C_S$ is the capacitance of the sense capacitor.

One drawback of conventional CDS technology is that the reset value is stored for the duration of the integration period, which can approach the frame period. A storage circuit (not shown) holds the value for this entire period. For a typical imager that operates at 30 frames per second, the storage period is 33 ms. Analog sample-and-hold circuits use large and expensive hold capacitors to achieve such a long hold time. Moreover, the storage circuit stores the reset values for the entire array of pixels because each pixel value is used for the resulting image. Although a frame buffer could be used to store the reset values for all the pixels, analog and digital frame buffers are impractical. Analog frame buffers consume significant chip area and draw substantial electrical power. For this reason, most frame buffers are digital. Digital frame buffers, however, also consume significant chip area and are expensive.

An alternative approach of providing CDS without frame buffers is to use a pinned diode as the photodiode. A pinned diode pixel works much the same way as a charge-coupled device (CCD) pixel. However, the pixels based on pinned diodes use additional semiconductor processing steps and also reduce the fill factor of the pixel.

To circumvent the problems associated with CDS technology, many CMOS imagers employ uncorrelated double sampling (UDS) (although many publications use the term CDS to generically describe both CDS and UDS). The UDS circuit of FIG. 1 is coupled to the readout column. A conventional UDS circuit uses the pixel voltage of the reset period subsequent to the current integration period, rather than the reset period prior to the integration period. In other words, the UDS circuit subtracts the subsequent reset value from the current integration value. Since the reset for a subsequent frame occurs immediately after the integration measurement of the current frame, the timeframe for storing the integration and reset values is relatively short. Typically, these measurements are held in capacitors such as in a switched-capacitor subtractor.

In particular, the conventional UDS circuit shown in FIG. 1 includes an integration sampling circuit with an input switch, $S_1$, a holding capacitor, $C_1$, and an output switch, $S_{O1}$. The integration sampling circuit samples and holds the integration value, $V_{O1}$. The depicted UDS circuit also includes a reset circuit with an input switch, $S_2$, a holding capacitor, $C_2$, and an output switch, $S_{O2}$. The reset circuit samples and holds the reset value, $V_{O2}$. After sampling both integration value and the reset value, the output switches close and send the integration and reset values to a subtraction module (not shown) that subtracts the reset value from the integration value.

Although UDS technology removes the fixed error (FPN) due to the threshold voltage and transistor size mismatches, it does not reduce the random reset noise because the reset noise introduced during the subsequent reset (i.e., for the next frame) is not correlated with the reset noise of the current frame. As a result, UDS technology actually increases total RMS reset noise by a factor of the square root of two because two uncorrelated noise quantities are present after the subtraction.

Referring to the previous example, UDS technology increases the sampled RMS noise from 643 μV to 910 μV for a typical sense capacitor value of 5 fF at room temperature. Therefore, conventional UDS technology is unsatisfactory to reduce the reset noise.

BRIEF DESCRIPTION OF THE DRAWINGS

The present invention is illustrated by way of example, and not by way of limitation, in the figures of the accompanying drawings, in which.

DETAILED DESCRIPTION

In the following description, numerous specific details are set forth, such as examples of specific commands, named components, connections, number of frames, etc., in order to provide a good understanding of several embodiments of the present invention. It will be apparent to one skilled in the art, however, that at least some embodiments of the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention.

The following detailed description includes circuits, which will be described below. Alternatively, the operations of the circuits may be performed by a combination of hardware, firmware, and software. The term "coupled to," as used herein, may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

A method and apparatus are described to perform low noise reset of a pixel circuit within an active pixel image sensor.

Figure 1:
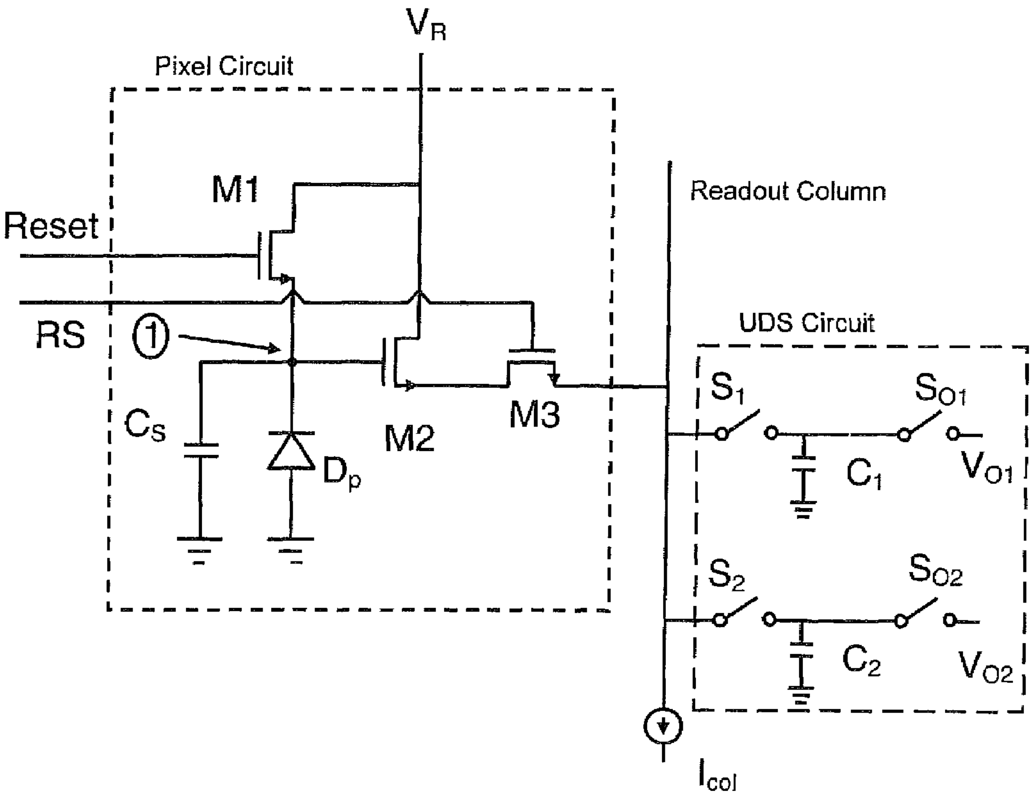
FIG. 1 illustrates a conventional pixel reset system.
Figure 2:
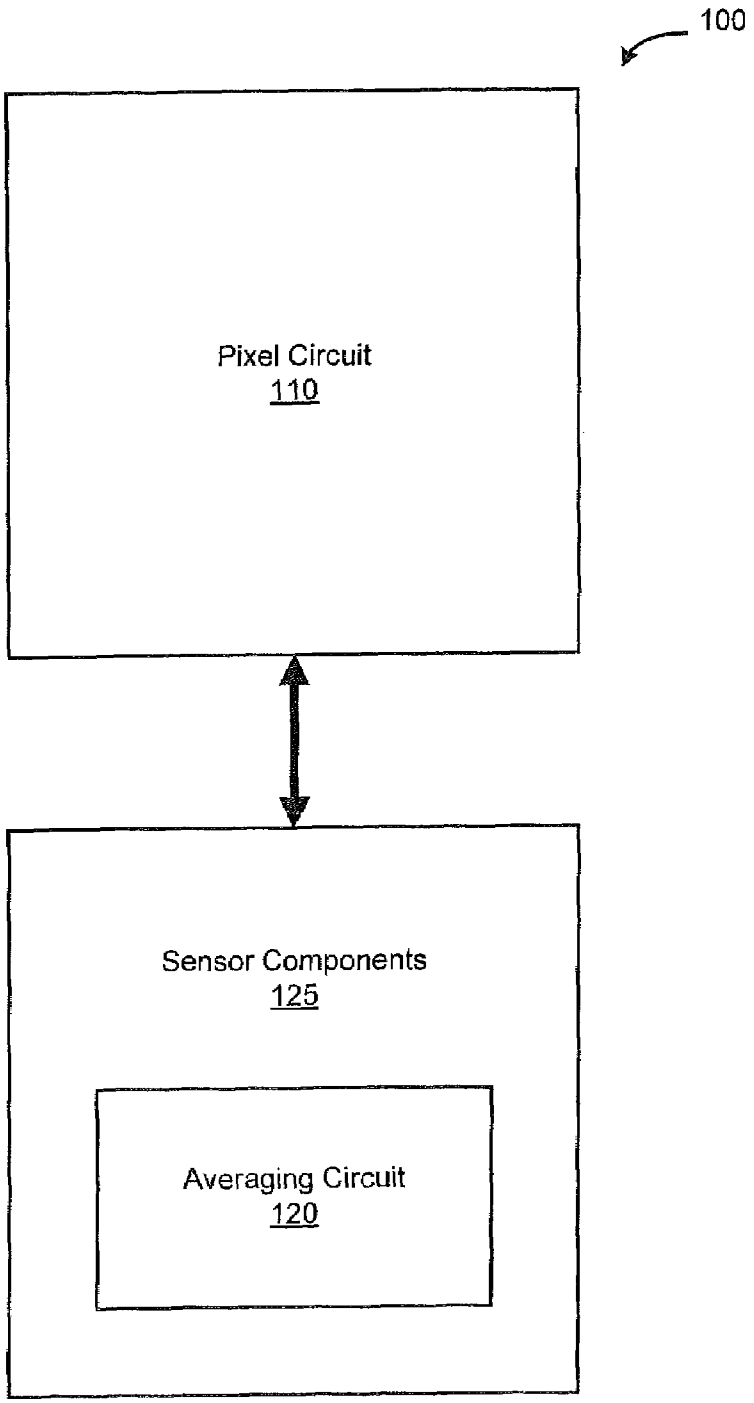
FIG. 2 illustrates a schematic block diagram of one embodiment of a pixel reset system.

FIG. 2 illustrates a schematic block diagram of one embodiment of a pixel reset system 100. The illustrated pixel reset system 100 includes a pixel circuit 110 and an averaging module 120. The pixel circuit 110 is coupled to a variety of sensor components 125, including the averaging module 120. In one embodiment, the pixel circuit 110 may be similar to the conventional pixel circuit shown in FIG. 1. In other embodiments, the pixel circuit 110 may be different from the conventional pixel circuit. Examples of the sensor components 125 are shown and described in more detail with reference to FIGS. 8 and 9.

One exemplary sequence of operation of the pixel circuit 110 is as follows: reset, integration, readout, reset, etc. During the reset period, the pixel circuit 110 establishes a known, baseline voltage. During the integration period, the pixel circuit 110 establishes a voltage relative to the light incident on the pixel circuit 110. During the readout period, the pixel circuit 110 transfers the integration voltage (or a voltage from which the integration voltage may be derived) to the averaging module 120 for processing. After the readout period, the pixel circuit 110 may restart the reset period and, in one embodiment, transfers one or more reset voltages to the averaging module 120. The integration and reset voltages also may be referred to as integration and reset values, respectively. The pixel circuit 110 transfers the integration and reset values to the averaging module 120 via one or more of the sensor components 125.

The averaging module 120 processes the integration value, as well as any reset values, to derive a photo response voltage, $V_P$. Alternatively, the averaging module 120 processes the integration and reset values to generate precursor values from which the photo response voltage may be derived. The photo response voltage is also referred to as a photo response value. The photo response value correlates with the voltage produced on a sense node in the pixel circuit 110 in response to the light incident on the pixel circuit 110. Using uncorrelated double sampling (UDS) technology, generally, the photo response voltage is described by the following equation:

$$V_P = V_{INT} - V_{(RST+1)},$$

where $V_{INT}$ is the integration voltage of the pixel circuit 110 at the end of the integration period and $V_{(RST+1)}$ is the reset voltage (or modified reset voltage) of the averaging module 120 corresponding to the reset period immediately following the integration period. In one embodiment, the averaging module 120 reduces or eliminates the fixed error and/or the random reset noise due to the pixel reset, as described below. Examples of the averaging module 120 are shown and described in more detail with reference to FIGS. 3 and 5.

Figure 3:
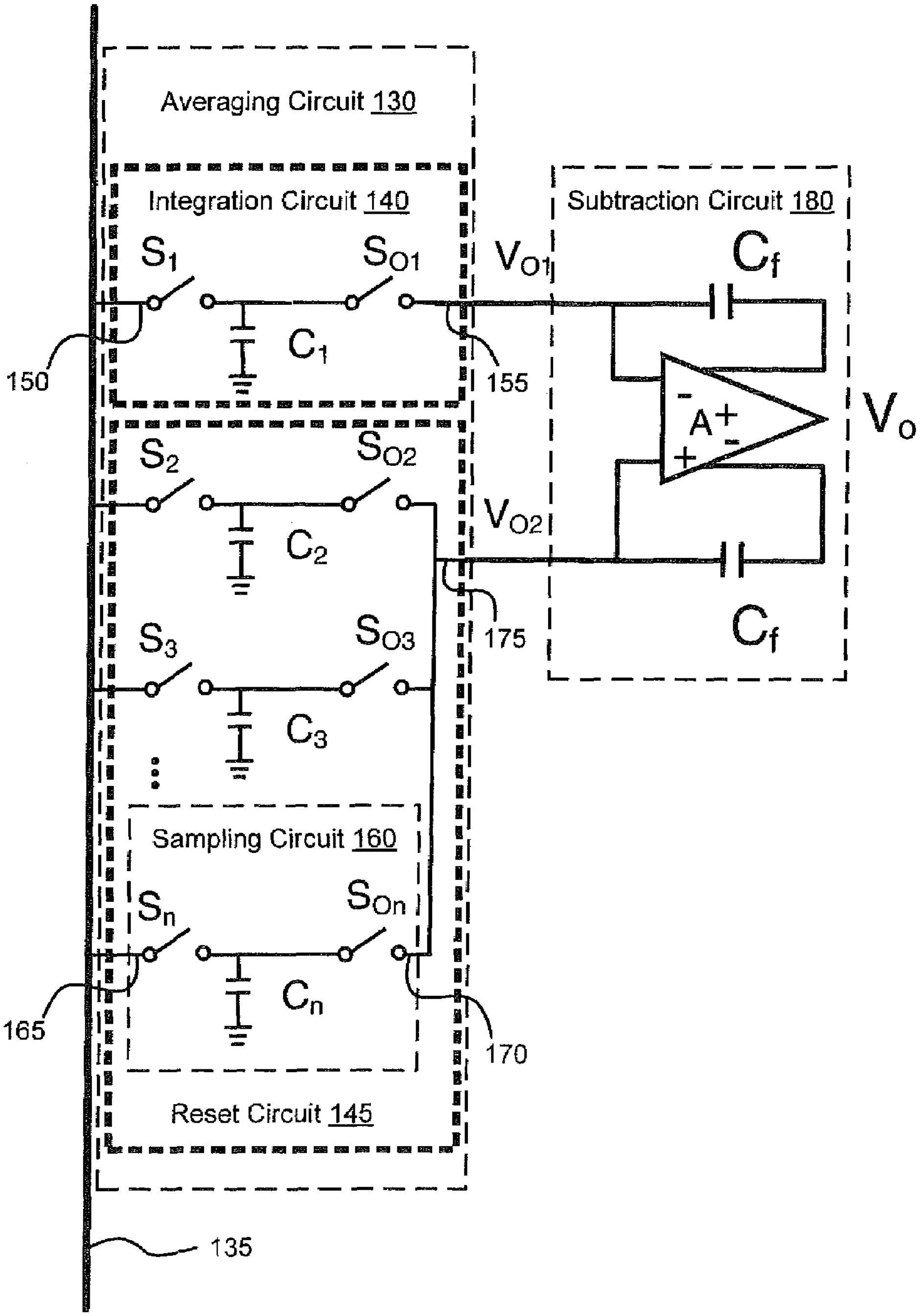
FIG. 3 illustrates one embodiment of an exemplary averaging module.

FIG. 3 illustrates one embodiment of an exemplary averaging module 130. The depicted averaging module 130 is coupled to a readout column 135 that, in turn, is coupled to a pixel circuit (not shown) such as the pixel circuit 110 of FIG. 2. In general, the averaging module 130 receives one or more independent input signals via the readout column 135 and produces two output signals, which are described in more detail below.

The illustrated averaging module 130 includes an integration circuit 140 and a reset circuit 145. The integration circuit 140 is configured to sample and hold the integration value. In one embodiment, the integration circuit 140 includes an input 150, an input switch $S_1$, a capacitor $C_1$, an output switch $S_{O1}$, and an output 155. During the integration period, the input switch closes and the integration value integrates on the capacitor, which is coupled between the two switches and a reference voltage such as ground. In this way, the integration circuit 140 samples and holds the integration value. The output switch subsequently outputs the sampled integration value, $V_{O1}$, from the integration circuit 140.

The reset circuit 145 is similarly configured to sample and hold one or more reset values. In one embodiment, the reset circuit 145 may include a plurality of sampling circuits 160. For example, the depicted reset circuit 145 includes three sampling circuits 160, although other embodiments of the reset circuit 145 may include fewer or more sampling circuits 160. Each sampling circuit 160 includes an input 165, an input switch $S_n$, a capacitor $C_n$, an output switch $S_{On}$, and an output 170. During the reset period, the input switch closes and a reset value integrates on the capacitor, which is coupled between the two switches and a reference voltage such as ground. In this way, the sampling circuit 160 samples and holds a reset value. The output switch subsequently outputs the sampled reset value from the sampling circuit 160.

With multiple sampling circuits 160, the reset circuit 145 can sample multiple reset values during a single reset period. For example, the reset circuit 145 may sequentially sample a first reset value on the capacitor $C_2$, a second reset value on the capacitor $C_3$, and so forth. Alternatively, the reset circuit 145 may sample some or all of the reset values in parallel. After sampling multiple reset values, the reset circuit 145 outputs the sampled reset values at approximately the same time to a common reset circuit output 175. In one embodiment, for example, the output switch of each of the sampling circuits 160 may be coupled to a common column line. In this way, the reset circuit 145 outputs a modified reset value, $V_{O2}$, which derives from the combination of the several sampled reset values.

Simultaneously outputting the several sampled reset values to the common reset circuit output 175 causes the sampled reset values to redistribute within the reset circuit 145. Due to the redistribution, the resulting modified reset value is approximately the average of the sampled reset values stored in the sampling circuits 160. By using the modified reset value rather than a single sample reset value, the RMS reset noise in the reset value is reduced by a factor of $\sqrt{n}$, where n is the total number or sampling circuits 160. For example, the RMS reset noise in the reset value is reduced by approximately $\sqrt{3}$ for a reset circuit 145 having three sampling circuits 160. With a large value of n, the reset noise in the modified reset value can be made arbitrarily low. However, the reset noise in the integration value is not necessarily affected because no "averaging" occurs in the integration circuit 140. Nevertheless, the reduced noise of the modified reset value lowers the total reset noise by up to a factor of about $\sqrt{2}$ compared to a conventional active pixel image sensor using convention UDS technology.

The averaging module 130 is coupled to a subtraction module 180 and supplies the integration value and the modified reset value to the subtraction module 180 for further processing. In particular, the subtraction module 180 subtracts the modified reset value from the integration value to produce a differential output voltage, $V_O$, which may represent the photo response voltage.

In one embodiment, the subtraction module 180 includes an operational amplifier, A, and one or more feedback capacitors, $C_f$. The feedback capacitors may be discharged prior to receiving the integration value and the modified reset value from the averaging module 130. Subsequently, the integration value and the modified reset value are transferred from the averaging module 130 to the subtraction module 180 to derive the differential output voltage. Additionally, the subtraction module 180 may amplify the differential output voltage. For example, the subtraction module 180 may have a gain given by the following equation:

$$G = \frac{C_1}{C_f},$$

where $C_1$ is the capacitance of the integration circuit 140 and $C_f$ is the feedback capacitance of the subtraction module 180.

Furthermore, the capacitance values of the sampling circuits 160 may be correlated with the capacitance of the integration circuit 140. In one embodiment, the total capacitance of all of the capacitors in the sampling circuits 160 may be approximately equal to the capacitance in the integration circuit 140. In a further embodiment, all of the capacitors of the sampling circuits 160 may be approximately equal in size. As an example, the size of each of three sampling capacitances may be approximately 330 fF for an integration capacitance of 1 pF. Using smaller capacitances for the sampling circuits 160 allows the size of the averaging module 130 to be approximately the same surface area on chip as a conventional UDS circuit that uses the same size capacitors (e.g., 1 pF) for both integration and reset circuitry. However, in alternative embodiments, the sampling capacitors may be of unequal sizes and/or may have a total capacitance that is more or less than the integration capacitance.

Figure 4:
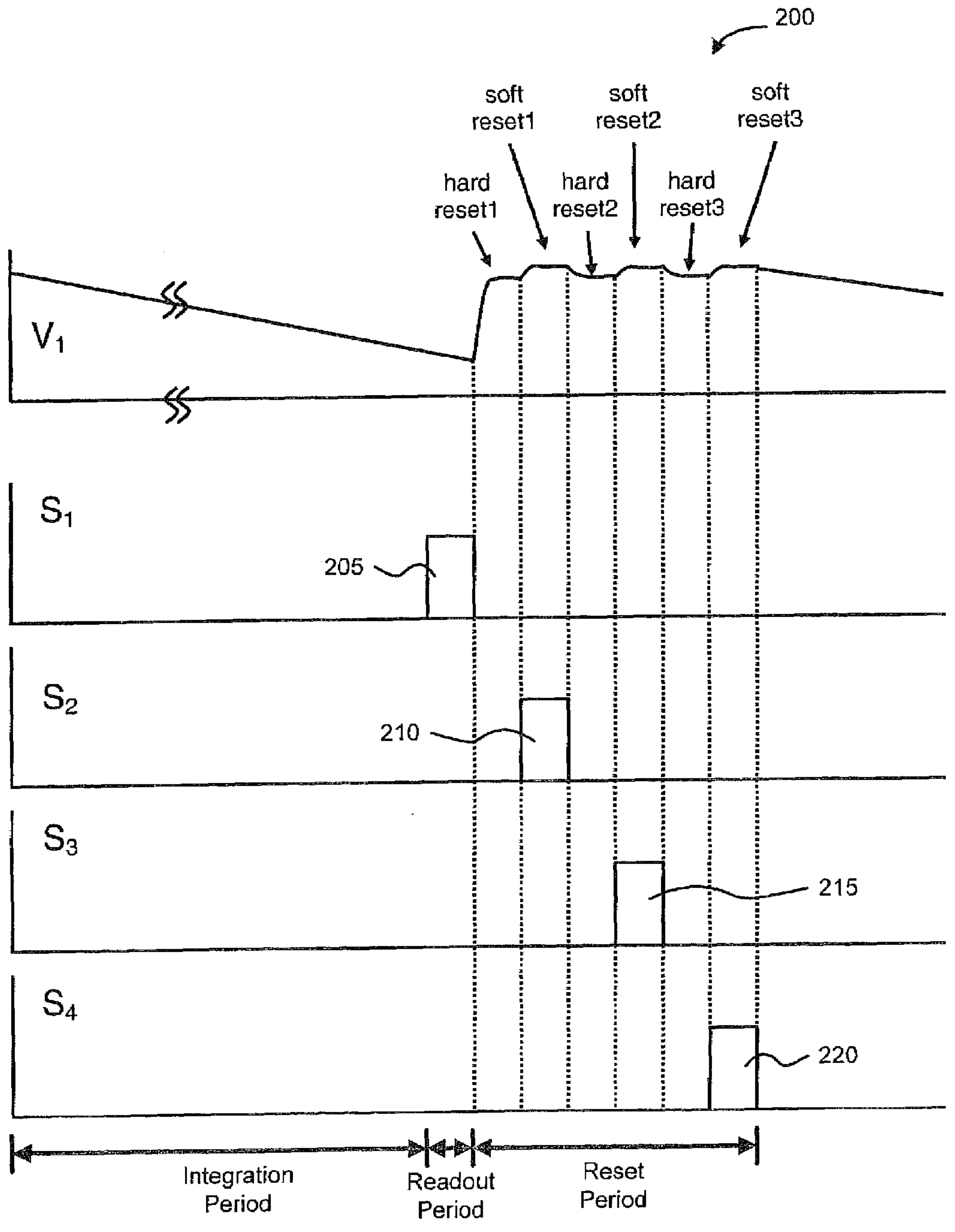
FIG. 4 illustrates one embodiment of a low noise reset timing diagram.

FIG. 4 illustrates one embodiment of a low noise reset timing diagram 200. The depicted timing diagram 200 illustrates several clocking signals for the integration and sampling circuits 140, 160 over the integration, readout, and reset periods (identified along the horizontal axis). The sense voltage, $V_1$, represents the voltage on the sense node of the pixel circuit 110. The first signal 205 corresponds to the activation of the input switch, $S_1$, of the integration circuit 140. The second signal 210 corresponds to the activation of the input switch, $S_2$, of a first sampling circuit 160. The third signal 215 corresponds to the activation of the input switch, $S_3$, of a second sampling circuit 160. The fourth signal 220 corresponds to the activation of the input switch, $S_4$, of a third sampling circuit 160. In another embodiment, the reset circuit 145 may have fewer or more sampling circuits 160 and corresponding control signals.

The integration circuit 140 samples the integration value from the sense node of the pixel circuit 110 to the integration capacitor at the end of the integration period. Alternatively, the integration circuit 140 may sample and hold the integration value during the readout period. The pixel 110 is then hard reset and soft reset. In general, a hard reset erases image lag, but introduces more noise than a soft reset. Combining a soft reset with a hard reset reduces the noise from the hard reset. However, in other embodiments, the pixel reset system 100 may use hard resets only, soft resets only, or another combination of hard and soft resets.

During the soft reset, the first sampling circuit 160 samples the reset value of the pixel circuit 110. The pixel 110 is then hard reset and soft reset, again. During the most recent soft reset, the second sampling circuit 160 samples the reset value of the pixel circuit 110. The pixel 110 is then hard reset and soft reset, again. During the most recent soft reset, the third sampling circuit 160 samples the reset value of the pixel circuit 110. This sequence may continue for as many sampling circuits 160 as are in the reset circuit 145. Subsequently, the reset circuit 145 may generate the modified reset value and the averaging module 130 and subtraction module 180 may process the modified reset value, as described above.

Figure 5:
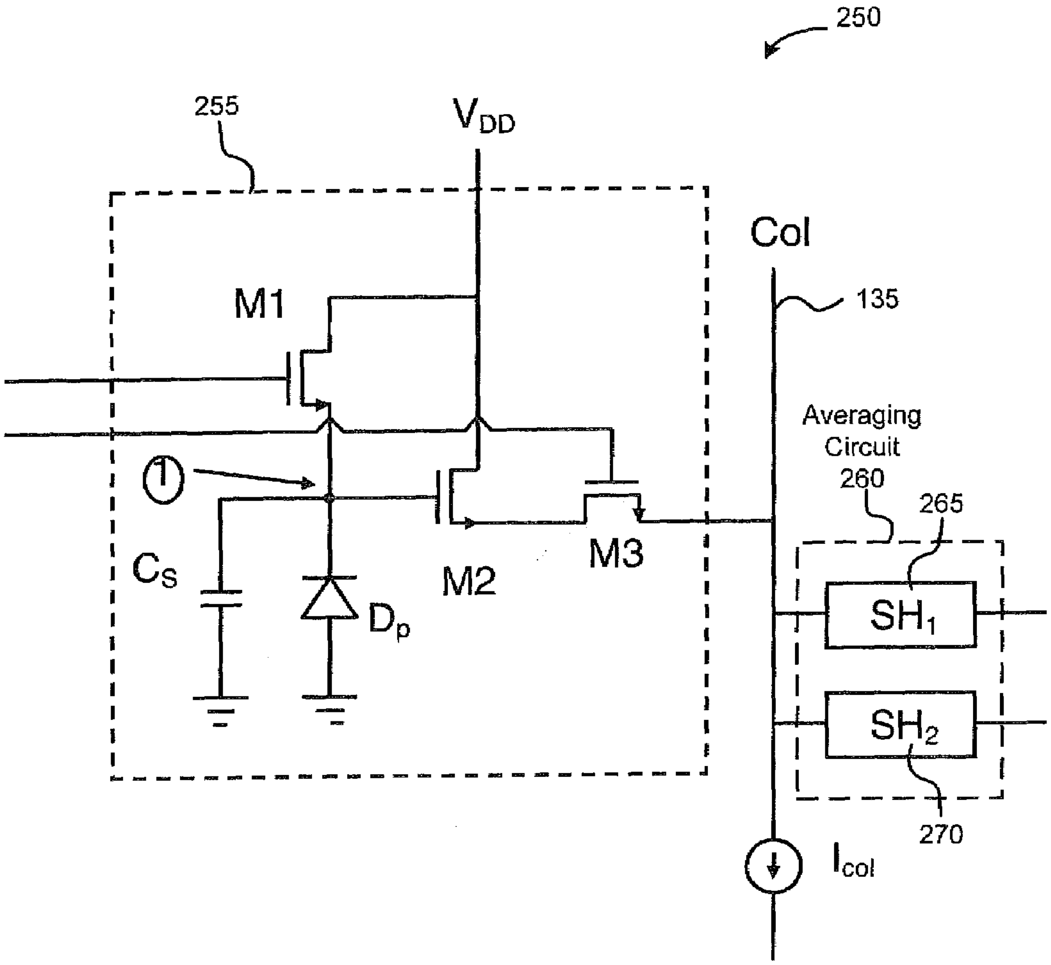
FIG. 5 illustrates another embodiment of an exemplary pixel reset system.

FIG. 5 illustrates another embodiment of an exemplary pixel reset system 250. The depicted pixel reset system 250 includes a pixel circuit 255 coupled to a pixel averaging module 260 via a readout column 135. Although the pixel circuit 255 may be similar to the conventional pixel circuit of FIG. 1, other embodiments of the pixel circuit 255 may be different from the conventional pixel circuit.

The averaging module 260 includes a first sample and hold circuit 265, $SH_1$, and a second sample and hold circuit 270, $SH_2$. The first SH circuit 265 samples and holds the integration value. The second SH circuit 270 samples and holds the reset value. Although the second SH circuit 270 only samples a single reset value, the second SH circuit 270 has a bandwidth that is substantially lower than the reset noise bandwidth of the pixel circuit 255. In one embodiment, the reset noise bandwidth of the pixel circuit 255 is associated with the sense capacitor, $C_S$, and the reset transistor, $M_1$. The relatively low bandwidth of the second SH circuit 270 effectively filters the reset noise from the reset value to produce a modified reset value at the output of the second SH circuit 270.

The modified reset value can be subtracted from the integration value to obtain the photo response value, as described above. In one embodiment, the integration value and the modified reset value may be multiplexed into an ADC for processing such as subtracting the modified reset value from the integration value. Multiplexing may occur at an array level, at a column level (so the array is wholly column parallel), at a level for a subset of columns (e.g., a block of five columns), and so forth. In other words, the point at which certain signals may be digitized and how those signals may be multiplexed to one or more data processing devices is not fixed and may vary depending on the implementation of the pixel circuit 110 or the pixel array or the image sensor. One example of an image sensor that implements multiplexing and digitization is shown and described in more detail with reference to FIG. 9.

In one embodiment, the second SH circuit 270 includes analog components similar to the sampling circuit 160 of FIG. 3. To establish a relatively low bandwidth for the second SH circuit 270, the resistance of the input switch may be large, such as 100 kΩ or higher. In another embodiment, the second SH circuit 270 may include a low pass filter to cut off noise above a given bandwidth. Other embodiments of the second SH circuit 270 may include other components to provide a relatively low bandwidth.

The reset noise bandwidth during a hard reset is described by the following equation:

$$N_{HARD} = \frac{1}{2\pi R_{ON} C_S},$$

where $R_{ON}$ is the ON resistance of the reset transistor and $C_S$ is the capacitance of the sense capacitor of the pixel circuit 255. In one embodiment, the sampling bandwidth of the second SH circuit 270 may be significantly lower than the reset noise bandwidth of a hard reset in order filter out most or all of the reset noise. As one example, the sampling bandwidth of the second SH circuit 270 may be approximately one tenth of the reset noise bandwidth.

The reset noise bandwidth during a soft reset is described by the following equation:

$$N_{SOFT} = \frac{g_{M1}}{2\pi C_S},$$

where $g_{M1}$ is the transconductance of the reset transistor of the pixel circuit 255. In one embodiment, the soft reset period may be very short, such as on the order of a microsecond or less, where the noise bandwidth is larger than the sampling bandwidth.

Figure 6:
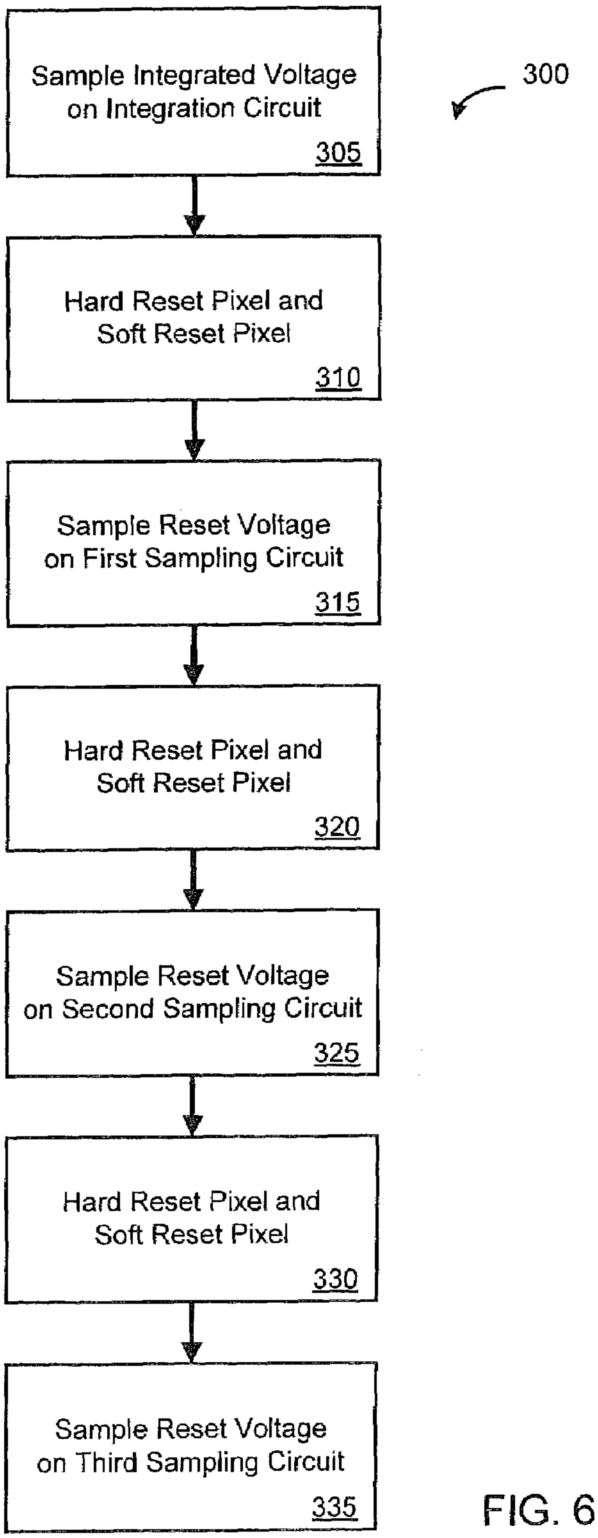
FIG. 6 illustrates one embodiment of a sampling method.

FIG. 6 illustrates one embodiment of a sampling method 300. The sampling method 300 may be implemented, for example, in conjunction with the averaging module 130 of FIG. 3 or another similar averaging module 120. Additionally, the sampling method 300 may be facilitated by the processor 92, the sequencer 96, or other components within the image sensor 62 shown and described in FIG. 8.

Figure 8:
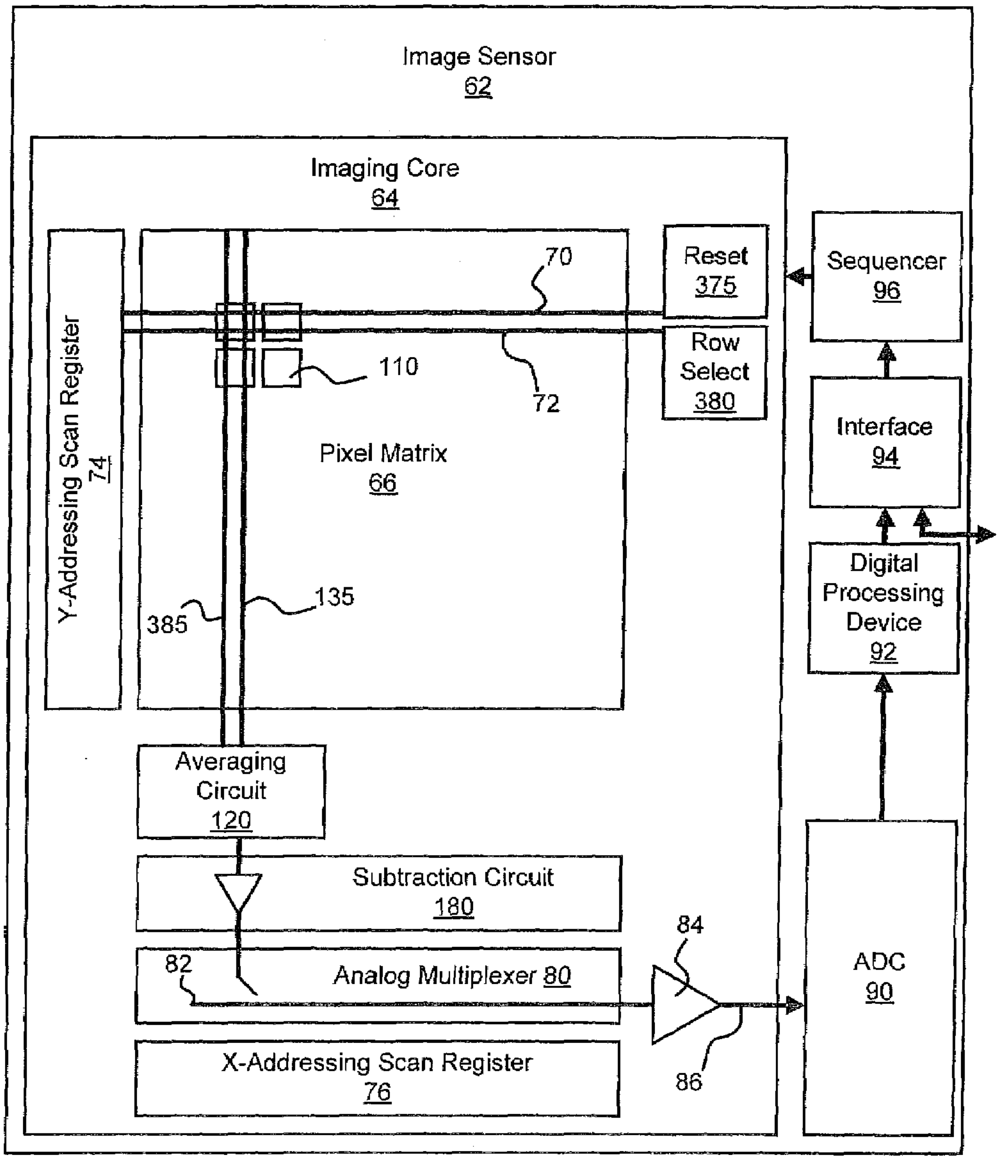
FIG. 8 illustrates one embodiment of an active pixel image sensor.

The illustrated sampling method 300 begins and the integration circuit 140 samples 305 and holds the integration voltage from the pixel circuit 110. The pixel circuit 110 is then hard reset and soft reset. In one embodiment, a reset supply 375 performs 310 the hard and soft resets. One example of the reset supply 375 is shown in FIG. 8. The reset supply 375 may perform the hard reset, for example, by lowering a reset voltage supplied to the reset transistor of the pixel circuit 110 from $V_{DD}$ to a voltage slightly below $V_{DD}$. The reset supply 375 may perform the soft reset, for example, by raising the reset voltage back up to $V_{DD}$.

While the reset supply 375 performs the soft reset, the first sampling circuit 160 samples 315 and holds a first reset value. Alternatively, the first sampling circuit 160 may sample the reset value after the first soft reset. Subsequently, the reset supply 375 performs 320 additional hard and soft resets, similar to the first hard and soft resets. The second sampling circuit 160 then samples 325 and holds the second reset value. The sampling method 300 continues in this cycle of resetting the pixel circuit 110 and sampling the reset values until all of the sampling circuits 160 are holding a sampled reset value. The sampling method 300 then ends. Alternatively, the sampling method 300 may discontinue after some, but before all, of the sampling circuits 160 hold sampled reset values.

Figure 7:
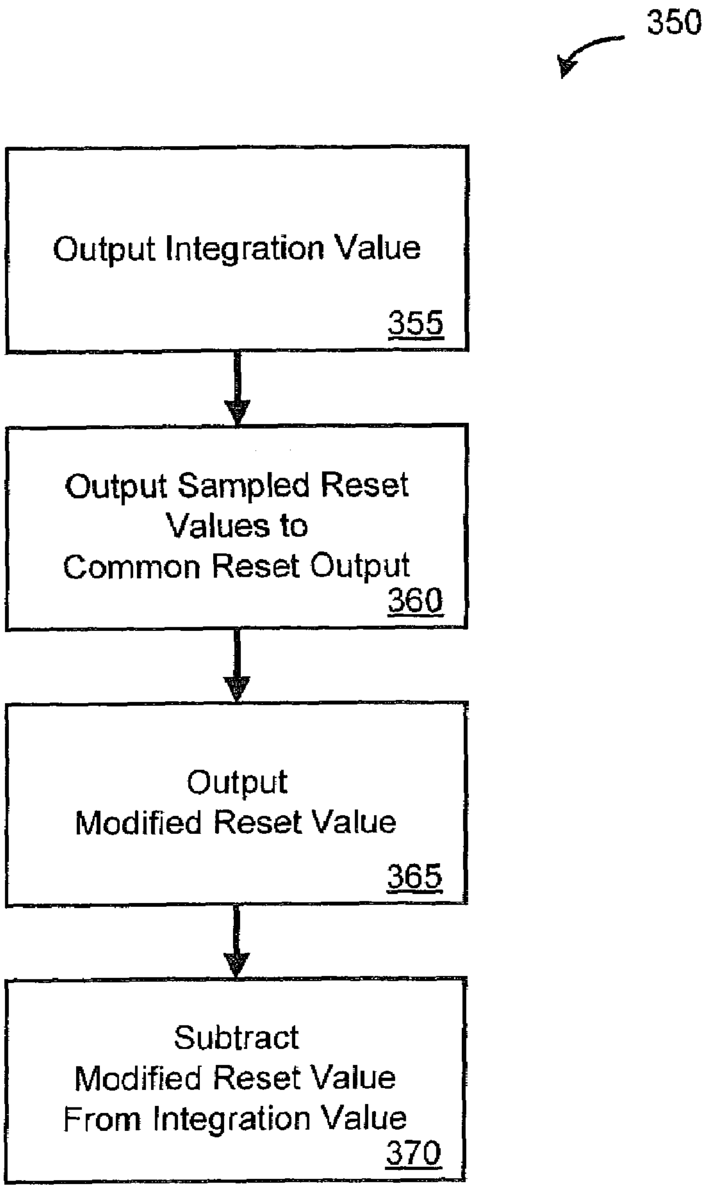
FIG. 7 illustrates one embodiment of an averaging method.

FIG. 7 illustrates one embodiment of an averaging method 350. The averaging method 350 may be implemented, for example, in conjunction with the averaging module 130 of FIG. 3, the averaging module 260 of FIG. 5, or another similar averaging module 120. Additionally, the averaging method 350 may be facilitated by the processor 92, the sequencer 96, or other components within the image sensor 62 shown and described in FIG. 8.

The illustrated averaging method 350 begins and the integration circuit 140 outputs 355 the integration value to the subtraction module 180. Simultaneously, or at approximately the same time, the sampling circuits 160 output 360 the plurality of sampled reset values to the common reset circuit output 175. As explained above, outputting the sampled reset values to the common reset output 175 redistributes the sampled reset values so that the reset circuit 145 outputs 365 a modified reset value. In one embodiment, the modified reset value is an "average" of the various sampled reset values. In another embodiment, the reset circuit 145 may output a modified reset value that is not based on multiple sampled reset values. The subtraction module 180 subsequently takes the integration value and the modified reset value as inputs to generate a differential value. In one embodiment, the differential value is the integration value minus the modified reset value. The depicted averaging method 350 then ends.

Another embodiment of the averaging module 120 may include an analog-to-digital converter (ADC) to perform some or all of the averaging operations in the digital domain, rather than in the analog domain. For example, a digital averaging module 390 may use a plurality of digitized reset values to generate a digital modified reset value. Then the digital averaging module 390 may digitally subtract the digital modified reset value from a digital integration value to produce the digital differential output value. One example of a digital averaging module is shown and described in more detail with reference to FIG. 9.

In another embodiment, the digital averaging module 390 may include a tracking ADC and calculate a digital modified reset valued from a plurality of digital sampled reset values. In one embodiment, the digital modified reset value may be a digital "average" of the plurality of digital sampled reset values. Subsequently, the digital averaging module 390 may produce the digital differential output value in a manner similar to the process described above. One example of an image sensor configured to perform such digital averaging is shown described in more detail with reference to FIG. 9.

In another embodiment, some or all of the averaging operations may be performed by software rather than hardware. The software may be executed on a digital processing device. The term "module" is used herein to encompass hardware, including analog and/or digital hardware components, and software implementations.

FIG. 8 illustrates one embodiment of an active pixel image sensor 62. The active pixel image sensor 62 is also shown and described in the context of an imaging system in FIG. 10. In one embodiment, the image sensor 62 is a color complimentary metal-oxide semiconductor (CMOS) image sensor. However, other types of image sensors may be used. For example, the image sensor 62 may be another type of metal-oxide semiconductor (MOS) image sensor. The illustrated image sensor 62 includes an imaging core 64 that includes a pixel matrix 66 and electronic components (imaging electronics) associated with the operation of the imaging core 64. In one embodiment, the imaging core 64 includes a pixel matrix 66 having an array of pixel circuits 110 (also referred to as pixels 110) and the corresponding driving and sensing circuitry for each pixel 110.

The pixel matrix 66 may be arranged in M columns of pixels 110 by N rows of pixels 110. Although detailed embodiments of the pixels 110 are described above with reference to previous figures, each pixel 110 has a width and a length and includes at least a photosensitive element and a readout switch. In certain embodiments, the pixels 110 of the pixel matrix 66 may be linear response pixels 110 (i.e., having linear or piecewise linear slopes).

Each row of pixels 110 is coupled to a reset line 70 and a row select line 72 (also referred to as a select line). The reset line 70 is coupled to a reset supply 375. Similarly, the row select line 72 is coupled to a row select supply 380. Additionally, each column of pixels 110 is coupled to a source column 385 and a readout column 135 (also referred to as a readout line). Examples of the readout column 135 are shown and described in more detail with reference to FIGS. 3 and 5. In certain embodiments, the readout column 135 may be coupled to an averaging module 120, although other embodiments of the image sensor 62 may omit the averaging module 120. One example of the averaging module 120 is shown and described in more detail with reference to FIG. 3. Another example of the averaging module 120 is shown and described in more detail with reference to FIG. 5. In other embodiments, each pixel 110 within a row may be coupled to other circuitry that couples one or more pixels 110, rows, or columns.

In one exemplary embodiment, the pixel array 66 may have approximately 2,000 columns by 1,500 rows of pixels 110. Each pixel 110 may be an adaptive dynamic range photodiode that is, for example, approximately 3.35 μm by 3.35 μm in size. The resulting pixel array 66 for that size of pixel 110 is about 6.75 mm by 5.08 mm in size. In other embodiments, the pixel array 66 may have more or less pixels 110, rows, or columns, or include other types and/or sizes of pixels 110.

In certain embodiments, the driving and sensing circuitry of the imaging core 64 may include one or more Y-addressing scanning registers 74 and one or more X-addressing scanning registers 76 in the form of shift registers or addressing registers. The circuitry of the imaging core 64 also may include buffers and/or line drivers (not shown) for the long reset and select lines. The circuitry of the imaging core 64 also includes a subtraction module 180, as described above with reference to FIG. 3. In one embodiment, the CDS circuitry is on-chip. In another embodiment, the subtraction module 180 is on a separate chip. The circuitry of the imaging core 64 also may include an analog multiplexer 80 coupled to an output bus 82.

In one embodiment, the Y-addressing scan register 74 addresses via the row select line 72 all of the pixels 110 of a row of the pixel matrix 66 to be read out. In this way, all of the switching elements of the pixels 110 of the selected row may be closed at approximately the same time to place a signal on a corresponding number of readout columns 135. The individual signals are subsequently processed and/or amplified in the subtraction module 180. Additionally, one or more filters may be used to improve the integrity of the signal.

In one embodiment, the X-addressing scan register 76 provides control signals to the analog multiplexer 80 to place an output signal (e.g., amplified charges) of the subtraction module 180 onto the output bus 82. The output bus 82 may be coupled to an output buffer 84 that provides an analog output 86 from the imaging core 64. In another embodiment, additional amplifiers and/or filters (not shown) may enhance the output signal 86 after it has been transmitted from the analog multiplexer 80.

In the depicted embodiment, the output signal 86 from the imaging core 64 is coupled to an analog-to-digital converter (ADC) 90 to convert the analog imaging core output 86 into the digital domain. In one embodiment, the ADC 90 is an on-chip 12-bit column parallel ADC. The ADC 90 is coupled to a digital processing device 92 to process the digital data received from the ADC 90. Such processing may be referred to as imaging processing or post-processing.

The digital processing device 92 may include one or more general-purpose processing devices such as a microprocessor or central processing unit, a controller, or the like. Alternatively, the digital processing device 92 may include one or more special-purpose processing devices such as a digital signal processor (DSP), an application specific integrated circuit (ASIC), a field programmable gate array (FPGA), or the like. In an alternative embodiment, for example, the digital processing device 92 may be a network processor having multiple processors including a core unit and multiple microengines. Additionally, the digital processing device 92 may include any combination of general-purpose processing device(s) and special-purpose processing device(s).

In one embodiment, the digital processing device 92 is coupled to an interface module 94 that handles the input/output (I/O) exchange with other components of the imaging system 10. The interface module 94 also may manage other tasks such as protocols, handshaking, voltage conversions, and so forth.

In one embodiment, the interface module 94 is coupled to a sequencer 96. Additionally, the sequencer 96 may be coupled to one or more components in the image sensor 62 such as, for example, the imaging core 64, the digital processing device 92, and the ADC 90. The sequencer 96 may be a digital circuit that receives externally generated clock and control signals via the interface module 94 and generates internal pulses to drive circuitry (for example, the imaging core 64, the ADC 90, etc.) in the imaging sensor 62.

Figure 9:
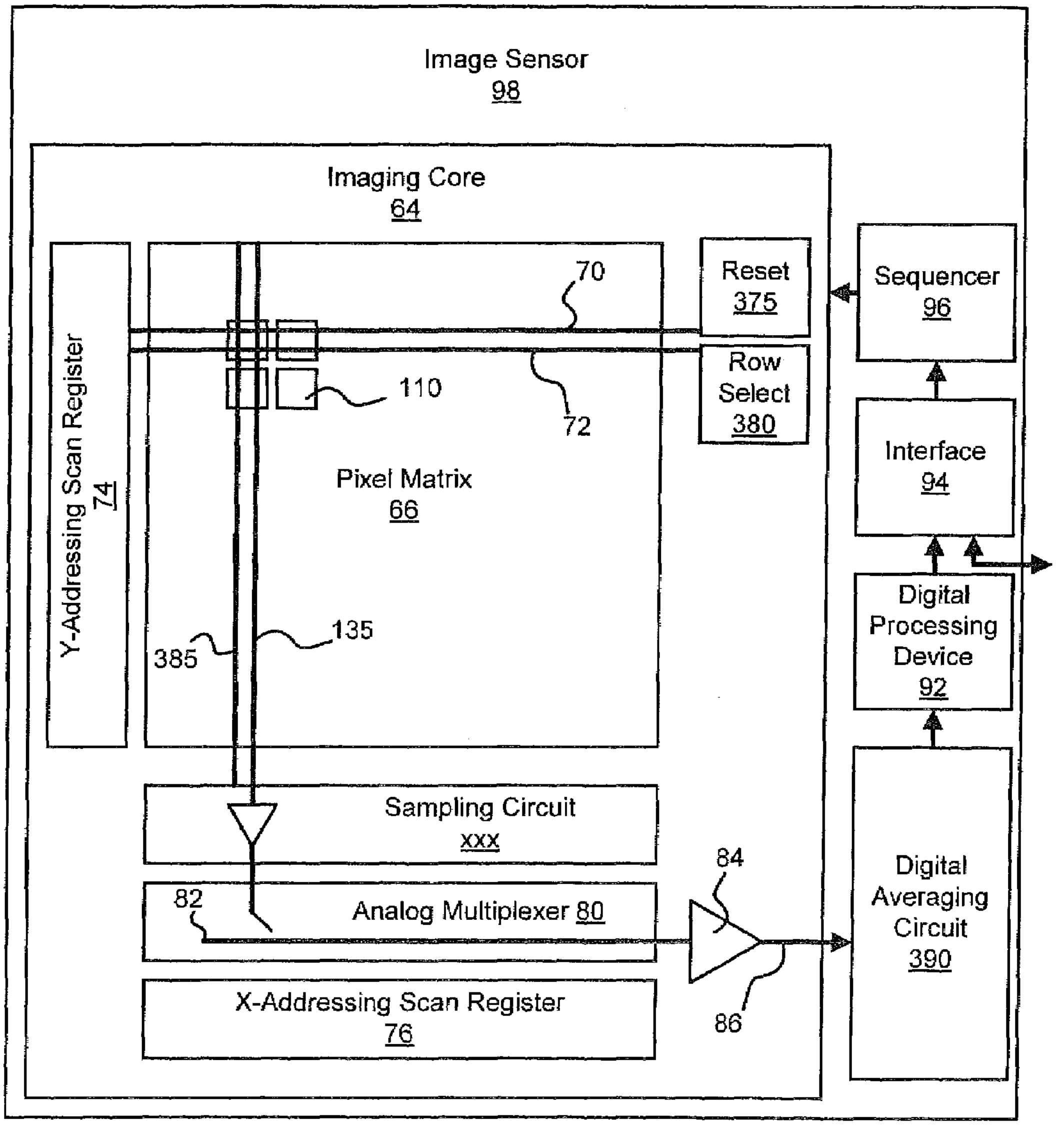
FIG. 9 illustrates another embodiment of an active pixel image sensor.

FIG. 9 illustrates another embodiment of an image sensor 98. The illustrated image sensor 98 includes many of the same components as the image sensor 62 of FIG. 8. For convenience and clarity, like components are identified by the same reference numbers and operate in a similar or identical manner as described above with reference to FIG. 8, except for any differences described below.

The depicted image sensor 98 of FIG. 9 includes a digital averaging module 390 and a sampling circuit 395. In certain embodiments, the digital averaging module 390 may include an ADC or a tracking ADC. Alternatively, the digital averaging module 390 may be coupled to a separate ADC within the image sensor 98. The digital averaging module 390 facilitates converting analog sample signals into corresponding signals. Additionally, the digital averaging module 390 may perform some or all of the processing of the digitized integration and reset values in order to produce a digital photo response value.

In one embodiment, the sampling circuit 395 is substantially similar to the sampling circuit 160 of FIG. 3 or the SH circuits 265, 270 of FIG. 5. The sampling circuit 395 includes one or more circuits to sample one or more readout lines 135 from the pixel array 66. The sampling circuit 395 also may include amplification and/or buffer circuitry.

Although particular embodiments of the image sensor 62 of FIG. 8 and the image sensor 98 of FIG. 9 are described herein, other embodiments of the image sensors 62, 98 may differ from the depicted embodiments in size, components, layout, and so forth. For example, alternative embodiments of the image sensors 62, 98 may include one ADC 90 for every pixel 110, for every column, or for a subset block of columns. Similarly, one or more other components within the image sensors 62, 98 may be duplicated and/or reconfigured for parallel or enhanced performance. Similarly, the layout of the individual components within the image sensors 62, 98 may be modified to adapt to the number and type of components. In another embodiment, some of the operations performed by the image sensors 62, 98 may be performed in the digital domain instead of the analog domain, and vice versa. One skilled in the art understands that these alternative embodiments are all within the scope of this description.

Furthermore, the pixel matrix 66 and associated imaging electronics within the imaging core 64 may each reside on a different die substrate and in different chip packages. Alternatively, the electronic components within the imaging core 64 may reside in a common chip package on separate integrated circuit die substrates or on a common die substrate.

Figure 10:
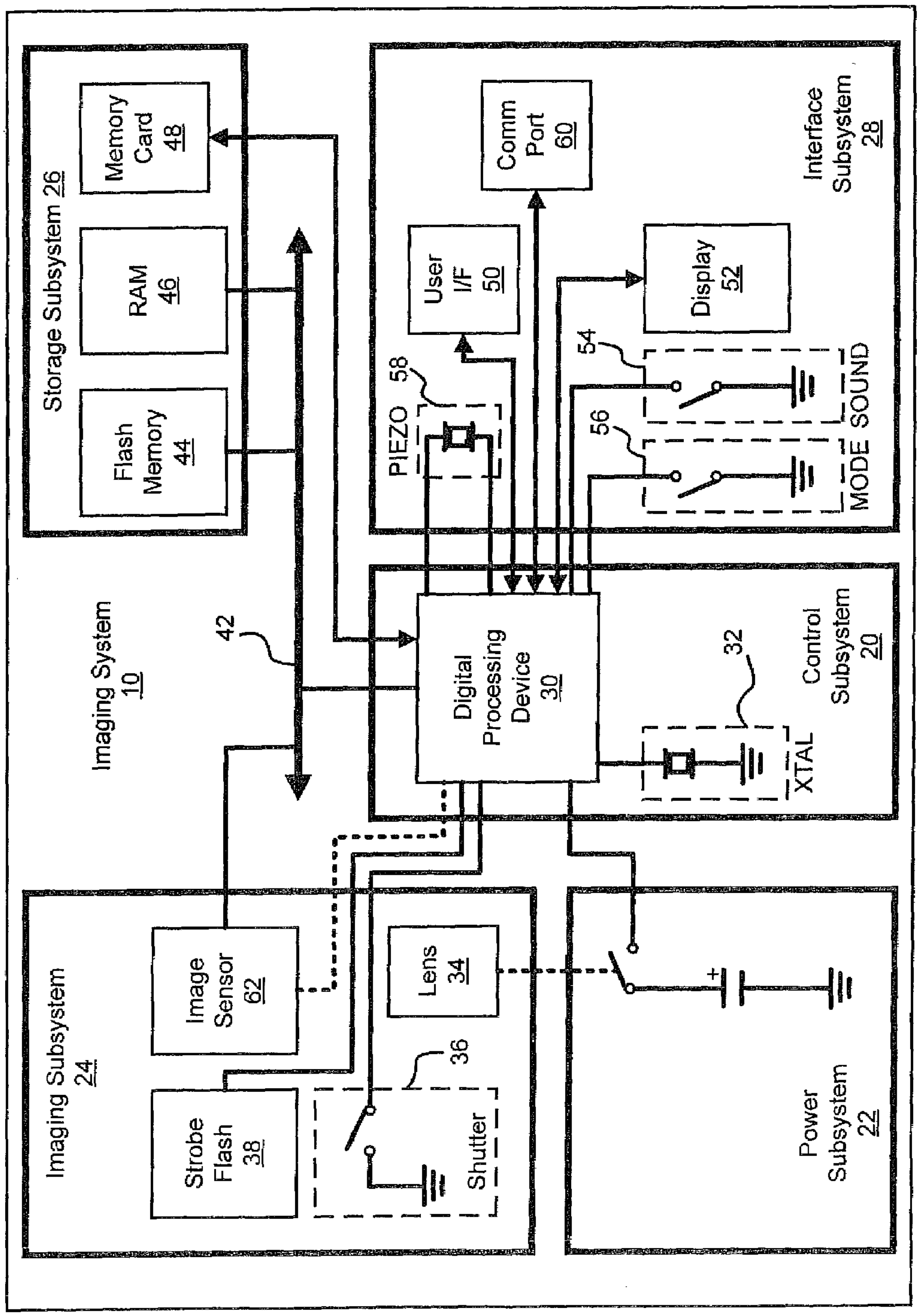
FIG. 10 illustrates one embodiment of an imaging system.

FIG. 10 illustrates one embodiment of an imaging system 10. The imaging system 10 is representative of various imaging systems that may be incorporated in one or more types of imaging devices, including still cameras, video cameras, scanners, automotive cameras, and so forth. For convenience, the imaging system 10 may be referred to as a camera 10, but is nevertheless understood to be representative of other types of imaging systems.

The illustrated imaging system 10 includes a control subsystem 20, a power subsystem 22, an imaging subsystem 24, a storage subsystem 26, and an interface subsystem 28. Although each of these subsystems is described herein with particular detail, other embodiments of the imaging system 10 may include fewer or more subsystems and/or fewer or more component parts of the individual subsystems.

In one embodiment, the control subsystem 20 includes a digital processing device 30. The digital processing device 30 may be may include one or more general-purpose processing devices such as a microprocessor or central processing unit, a controller, or the like. Alternatively, the digital processing device 30 may include one or more special-purpose processing devices such as a digital signal processor (DSP), an application specific integrated circuit (ASIC), a field programmable gate array (FPGA), or the like. Additionally, the digital processing device 30 may include any combination of general-purpose processing device(s) and special-purpose processing device(s). In an alternative embodiment, for example, the digital processing device 30 may be a network processor having multiple processors including a core unit and multiple microengines. In the described embodiment, the digital processing device 30 is an ASIC, but references to the ASIC 30 herein are understood to be representative of the digital processing device 30, generally.

The digital processing device 30 may include a microprocessor, one or more memory devices, control logic, and the like, in order to implement particular operations within imaging system 10. For example, the digital processing device 30 may facilitate taking a digital picture, including acquiring an image via the imaging subsystem 24, digitizing the image, processing the image, displaying the image via the interface subsystem 28, storing the image via the storage subsystem 26, and transferring the image to an external storage device (not shown). Similarly, the digital processing device 30 may implement instructions from a user received via the interface subsystem 28. In one embodiment, the digital processing device 30 also may include an internal read-only memory (ROM) for firmware storage. Furthermore, the digital processing device 30 may facilitate firmware or software updates within the imaging system 10. The control subsystem 20 also may include a quartz crystal 32, oscillator, or other clocking device to supply a clock signal to the digital processing device 30.

In one embodiment, the power subsystem 22 includes a battery circuit to supply electrical power to the digital processing device 30 and other subsystems within the imaging system 10. The power subsystem 22 may include a permanent battery, temporary batteries, a recharging circuit, regulators or other current control circuitry, one or more switches, and so forth. In another embodiment, the power subsystem 22 may include a power adapter to accept alternating current (AC) or direct current (DC) power from an external power supply (not shown). In another embodiment, the power subsystem 22 may be configured to accept power via a universal serial bus (USB) port, or other communication port, whenever the imaging system 10 is plugged into a PC or other computing device.

In one embodiment, the imaging subsystem 24 includes a lens assembly 34 having one or more optical lenses, a shutter 36, a strobe flash 38, and the image sensor 62. The imaging subsystem 24 captures images and converts them into digital form. In one embodiment, the image sensor 62 may be coupled to a bus 42 that is coupled to the digital processing device 30. One example of the image sensor 62 is depicted and described in more detail with reference to FIG. 4.

The lens assembly 34 directs incident light to a pixel array within the image sensor 62. In one example, the lens assembly 34 may include a lens stack integrated with the image sensor 62. In another embodiment, the lens assembly 34 may have other characteristics. The shutter 36 allows the light to be detected by the image sensor 62. The strobe flash 38 provides additional light, in addition to any ambient light, to illuminate a scene approximately during the time the image sensor 62 detects an image. In one example, the strobe flash 38 automatically activates in response to detected low light levels. In other embodiments, lens assemblies, shutters, and flashes that are generally known in the art may be suitable for use with the imaging system 10, although more specialized or custom devices also may be used with the imaging system 10.

In one embodiment, the storage subsystem 26 includes a flash memory device 44, a random access memory (RAM) device 46, and a memory card 48. Although a flash memory 44 is depicted, other types of memory may be used in conjunction with or in place of the flash memory 44, including read-only memory (ROM), programmable ROM (PROM), erasable PROM (EPROM), and electrically erasable PROM (EEPROM). Alternatively, other types of memory may be used. The flash memory 44 and the RAM 46 may be coupled to the bus 42. The digital processing device 30 may coordinate bus arbitration and the transfer of image data from the imaging subsystem 24 to the storage subsystem 26. The RAM 46 may be nonvolatile and store software or other control instructions that are used by the digital processing device 30 to operate the imaging system 10. For example, the digital processing device 30 may load firmware instructions from an internal ROM into the RAM 46. In one example, the RAM 46 is synchronous RAM (SRAM). In another embodiment, the RAM 46 is synchronous dynamic RAM (SDRAM). Alternatively, the RAM 46 may be another type of volatile or nonvolatile RAM.

The flash memory 44 or the RAM 46 may store images and/or image metadata (e.g., image capture parameters, camera mode settings, electrical power settings, etc.) from the imaging subsystem 24, for example. In one embodiment, the image data is initially stored in the RAM 46 and then transferred to the flash memory 44 for more permanent storage. The digital processing device 30 may initiate a direct memory transfer (DMA) to transfer the image data from the RAM 46 to the flash memory 44. The microprocessor within the digital processing device 30 may include several DMA engines to perform the DMA operations. In certain embodiments, the DMA engines may facilitate the following transfers: imaging subsystem 24 to RAM 46, RAM 46 to flash memory 44, flash memory to RAM 46, RAM 46 to memory card 48, memory card 48 to RAM 46, and so forth. In one embodiment, the flash memory 44 is NAND flash memory ranging in size from 4 to 32 megabytes (MB), although other types and/or sizes of flash memory may be used.

The memory card 48 is a memory card such as a secure digital (SD) memory card, a mini SD card, an ultra-compact (xD) memory card, a multimedia card (MMC), a microdrive, a universal serial bus (USB) flash drive, or another type of removable or non-removable memory media. In one embodiment, the memory card 48 may be permanently coupled to the storage subsystem 26.

In one embodiment, the interface subsystem 28 includes a user interface (I/F) module 50, a display device 52, one or more sound modules 54, one or more mode modules 56, a piezo buzzer module 58 (also known as a piezo resonator), and a communication port 60. The user interface module 50 may include hardware components such as buttons, as well as accompanying software, to allow a user to interface with the imaging system 10. In particular, the user interface module 50 may allow a user to make selections regarding the operation of the imaging system 10, the use of the strobe flash 38 and other capture parameters, the location of stored images on the storage subsystem 26, and so forth. Additionally, the interface subsystem 28 may be partially or wholly configurable by the firmware.

The display device 52 communicates visual images, including digitized images from the imaging subsystem 24, user selection menus, status indicators, and so forth, to the user. In one embodiment, the display device 52 is a liquid crystal display (LCD) such as a thin film transistor (TFT) display. In another embodiment, the display device 52 may employ another technology to generate and present an image to the user. The sound module 54 controls sounds produced by the imaging system 10. The mode module 56 controls the operational mode of the imaging system 10. For example, the imaging system 10 may have various capture modes, including bright, dark, far, near, action, portrait, and so forth. The buzzer module 58, in one embodiment, is a piezo resonator to produce variable pitch tones.

The communication port 60 allows connectivity with another electronic device such as a desktop computer (not shown) or other computing device. In the illustrated embodiment, the communication port 60 is a USB port, but references to the USB port 60 herein are understood to refer to the communication port 60, generally. In one embodiment, the communication port 60 may be used to provide power to recharge a battery in the power subsystem 22, transfer images and image metadata from the storage subsystem 26 (e.g., the flash memory 44 or the memory card 48) to a desktop computer, for example, and communicate firmware upgrades from the desktop, for example, to the digital processing device 30. In one example, the communication port 60 may be a USB 2.0 port.

The electronic components of the imaging system 10 may each reside on a different die substrate and in different chip packages. Alternatively, some or all of the electronic components of the imaging system 10 may reside in a common chip package on separate integrated circuit die substrates or on a common die substrate.

The image sensor 62 discussed herein may be used in various applications. For example, embodiments of the image sensor 62 may be used in a digital camera system for general-purpose photography (e.g., camera phone, still camera, video camera) or special-purpose photography. In other embodiments, the image sensor 62 may be used in other types of applications. For example, embodiments of the image sensor 62 may be used in machine vision, document scanning, microscopy, security, biometry, and other similar applications.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

While some specific embodiments of the invention have been shown the invention is not to be limited to these embodiments. The invention is to be understood as not limited by the specific embodiments described herein, but only by scope of the appended claims.

What is claimed is:

1. An apparatus, comprising:

a pixel circuit to detect incident light and integrate an integration value during an integration period;

a rest circuit to generate multiple reset values during a single reset period, said multiple reset values being applied to said pixel circuit during said single reset period; and an averaging module coupled to the pixel circuit to sample the integration value and to sample said multiple reset values applied to said pixel circuit during said single reset period;

said averaging module generating a modified reset value from said multiple reset values applied to said pixel circuit during said single reset period.

2. The apparatus of claim 1, wherein said averaging module comprises a plurality of sampling circuits to sample said multiple reset values applied to said pixel circuit during said single reset period.

3. The apparatus of claim 2, wherein each of the plurality of sampling circuits comprises:

an input and an output;

an input switch coupled to the input;

a sampling capacitor coupled to the input switch and a reference voltage; and an output switch coupled to the capacitor and the output.

4. The apparatus of claim 3, wherein the modified reset value comprises a distributed reset value of said multiple reset values applied to said pixel circuit during said single reset period.

5. The apparatus of claim 3, wherein said averaging module comprises an integration capacitance, the sampling capacitor of each of the plurality of sampling circuits comprises a sampling capacitance of approximately the integration capacitance divided by a total number of the sampling capacitors.

6. The apparatus of claim 5, further comprising a readout column and a current source coupled to the readout column, wherein the pixel circuit and said averaging module are coupled to the readout column.

7. The apparatus of claim 1, wherein said averaging module comprises a sample and hold circuit to sample and hold said multiple reset values applied to said pixel circuit during said single reset period, the sample and hold circuit having a sampling bandwidth lower than a noise bandwidth associated with a reset transistor and a sense capacitor of the pixel circuit.

8. The apparatus of claim 7, wherein said averaging module further comprises a low pass filter coupled to the sample and hold circuit, the low pass filter to cut off a reset noise signal above a bandwidth cutoff of the low pass filter.

9. The apparatus of claim 7, further comprising a readout column and a current source coupled to the readout column, wherein the pixel circuit and said averaging module are coupled to the readout column, said averaging module comprising a second sample and hold circuit to sample and hold the integration value.

10. The apparatus of claim 1, wherein the averaging module comprises an analog-to-digital converter to convert the integration value to a digital integration value and said multiple reset values applied to said pixel circuit during said single reset period to corresponding digital reset values.

11. The apparatus of claim 10, wherein said averaging module is further configured to generate the modified reset value from an average of said digital reset values.

12. The apparatus of claim 10, wherein the analog-to-digital converter comprises a tracking analog-to-digital converter to digitize a difference between a first reset value and a second reset value of said multiple reset values applied to said pixel circuit during said single reset period.

13. The apparatus of claim 12, further comprising:

a readout column coupled to the pixel circuit;

a sampling circuit coupled to the readout column to sample the integration value and said multiple reset values applied to said pixel circuit during said single reset period; and a multiplexer coupled to the sampling circuit to receive said multiple reset values applied to said pixel circuit during said single reset period from the sampling circuit and multiplex said multiple reset values applied to said pixel circuit during said single reset period to said averaging module.

14. The apparatus of claim 1, further comprising:

a reset noise reduction circuit to reduce reset noise in one of the sampled multiple reset values applied to said pixel circuit during said single reset period;

said averaging module generating a modified reset value from said multiple reset values applied to said pixel circuit during said single reset period.

15. The apparatus of claim 14, wherein said averaging module generating a modified reset value from the sampled multiple reset values applied to said pixel circuit during said single reset period and the sampled multiple reset values applied to said pixel circuit during said single reset period having a reduced reset noise.

16. The apparatus of claim 15, wherein said averaging module averages the sampled multiple reset values applied to said pixel circuit during said single reset period to generate the modified reset value.

17. The apparatus of claim 15, further comprising means for subtracting the modified reset value from the integration value.

18. The apparatus of claim 14, further comprising means for converting the sampled multiple reset values applied to said pixel circuit during said single reset period digital reset values.

19. The apparatus of claim 14, further comprising means for erasing image lag.

20. The apparatus of claim 19, further comprising means for reducing hard reset noise introduced by a hard reset.

21. The apparatus of claim 14, further comprising means for reducing a total noise in the photo response value.

22. A method, comprising:

sampling an integration value from a pixel circuit, the integration value corresponding to a first frame;

generating multiple reset values during a single reset period, the multiple reset values being applied to the pixel circuit during the single reset period;

sampling the multiple reset values being applied to the pixel circuit during the single reset period, the multiple reset values being applied to the pixel circuit during the single reset period corresponding to a subsequent frame; and generating a modified reset value from the sampled multiple reset values being applied to the pixel circuit during the single reset period.

23. The method of claim 22, further comprising averaging the sampled multiple reset values being applied to the pixel circuit during the single reset period to generate the modified reset value.

24. The method of claim 23, further comprising subtracting the modified reset value from the integration value.

25. The method of claim 22, further comprising holding the sampled multiple reset values being applied to the pixel circuit during the single reset period in a plurality of sampling capacitors having a total sampling capacitance approximately equal to an integration capacitance of an integration capacitor to hold the integration value.

26. The method of claim 22, further comprising sampling and holding the multiple reset values being applied to the pixel circuit during the single reset period in a reset circuit having a sampling bandwidth lower than a noise bandwidth associated with a reset transistor and a sense capacitor of the pixel circuit.

27. The method of claim 26, further comprising subtracting the modified reset value from the integration value.

28. The method of claim 22, wherein the multiple reset values being applied to the pixel circuit during the single reset period comprise only hard reset values.

29. The method of claim 22, wherein the multiple reset values being applied to the pixel circuit during the single reset period comprise only soft reset values.

30. The method of claim 22, wherein the multiple reset values being applied to the pixel circuit during the single reset period comprise one or more reset value pairs, each reset value pair comprising a hard reset value a corresponding soft reset value.

31. The method of claim 22, further comprising:

converting the sampled integration value to a digital integration value; and converting the sampled multiple reset values being applied to the pixel circuit during the single reset period to digital reset values.

32. The method of claim 31, further comprising averaging the digital reset values to generate the modified reset value.

33. The method of claim 32, further comprising subtracting the modified reset value from the integration value.

34. The method of claim 32, wherein the digital reset values comprises a digital tracking value corresponding to a difference between two consecutive reset values of the sampled multiple reset values being applied to the pixel circuit during the single reset period.

* * * * *